(12) United States Patent
Liao et al.

(10) Patent No.: US 10,520,802 B2
(45) Date of Patent: Dec. 31, 2019

(54) ILLUMINATION SYSTEM AND PROJECTION APPARATUS

(71) Applicant: Coretronic Corporation, Hsin-Chu (TW)

(72) Inventors: Chien-Chung Liao, Hsin-Chu (TW); Chih-Hsien Tsai, Hsin-Chu (TW); Haw-Woei Pan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/221,597

(22) Filed: Dec. 17, 2018

(65) Prior Publication Data

US 2019/0187544 A1 Jun. 20, 2019

(30) Foreign Application Priority Data

Dec. 18, 2017 (CN) .......................... 2017 1 1363155

(51) Int. Cl.
*G03B 21/20* (2006.01)
*G02B 26/00* (2006.01)
(Continued)

(52) U.S. Cl.
CPC ......... *G03B 21/204* (2013.01); *G02B 26/008* (2013.01); *G02B 27/1026* (2013.01);
(Continued)

(58) Field of Classification Search
CPC .. G03B 21/204; G03B 21/28; G02B 27/1026; G02B 26/008; G02B 27/149; F21V 9/08; F21V 7/22
See application file for complete search history.

(56) References Cited

U.S. PATENT DOCUMENTS 5,096,280 A * 3/1992 Hamada ............. G02B 27/1046
348/E9.027
8,496,333 B2 * 7/2013 Wang ................. G02B 26/0833
353/84
(Continued)

FOREIGN PATENT DOCUMENTS

CN 201852981 6/2011
CN 102707551 10/2012
(Continued)

*Primary Examiner* — Tracie Y Green
(74) *Attorney, Agent, or Firm* — JCIPRNET

(57) ABSTRACT

An illumination system including a first light-emitting module, a wavelength conversion unit, and a spherical-shell-shaped dichroic film is provided. The first light-emitting module emits a first color light including a first partial light and a second partial light. The first partial light is converged to the wavelength conversion unit, the second partial light passes by a location beside the wavelength conversion unit, and the wavelength conversion unit converts the first partial light into a converted light, where a wavelength of the converted light is greater than a wavelength of the first color light. The spherical-shell-shaped dichroic film is pervious to the at least one first color light, and reflects the converted light, where the converted light coming from the wavelength conversion unit is reflected by the spherical-shell-shaped dichroic film, and at least partially coincides with the second partial light. A projection apparatus is also provided.

20 Claims, 12 Drawing Sheets

(51) Int. Cl.
*G03B 21/28* (2006.01)
*G02B 27/10* (2006.01)
*F21V 7/22* (2018.01)
*F21V 9/08* (2018.01)
*G02B 27/14* (2006.01)

(52) U.S. Cl.
CPC ........... *G03B 21/28* (2013.01); *F21V 7/22* (2013.01); *F21V 9/08* (2013.01); *G02B 27/149* (2013.01)

(56) References Cited

U.S. PATENT DOCUMENTS

| | | | |
|---|---|---|---|
| 10,156,716 B2* | 12/2018 | Asano | G03B 21/204 |
| 10,379,431 B2* | 8/2019 | Chiu | G03B 33/08 |
| 2006/0007407 A1 | 1/2006 | Matsui | |
| 2013/0242534 A1 | 9/2013 | Pettitt et al. | |
| 2014/0022760 A1 | 1/2014 | Hartwig | |
| 2015/0167907 A1 | 6/2015 | Hoehmann | |
| 2018/0173087 A1 | 6/2018 | Hsieh et al. | |
| 2019/0235368 A1* | 8/2019 | Liao | G02B 26/008 |

FOREIGN PATENT DOCUMENTS

| | | |
|---|---|---|
| CN | 102147561 | 11/2012 |
| CN | 102193296 | 3/2013 |
| CN | 103283046 | 9/2013 |
| CN | 103453448 | 12/2013 |
| CN | 102418907 | 4/2014 |
| CN | 102563410 | 8/2014 |
| CN | 102289141 | 7/2015 |
| CN | 204593250 | 8/2015 |
| CN | 105353578 | 2/2016 |
| CN | 104238248 | 7/2016 |
| JP | 2012159603 | 8/2012 |
| JP | 2012185369 | 9/2012 |
| JP | 2015184407 | 10/2015 |
| TW | I260923 | 8/2006 |
| TW | I370316 | 8/2012 |
| TW | I504832 | 10/2015 |
| TW | I540377 | 7/2016 |
| TW | M529190 | 9/2016 |
| TW | M547687 | 8/2017 |
| TW | I605295 | 11/2017 |
| TW | 201822184 | 6/2018 |

* cited by examiner

ILLUMINATION SYSTEM AND PROJECTION APPARATUS

CROSS-REFERENCE TO RELATED APPLICATION

This application claims the priority benefit of China application serial no. 201711363155.1, filed on Dec. 18, 2017. The entirety of the above-mentioned patent application is hereby incorporated by reference herein and made a part of this specification.

BACKGROUND OF THE INVENTION

Field of the Invention

The invention relates to an illumination system and a projection apparatus, and particularly relates to an illumination system and a projection apparatus with a simple structure.

Description of Related Art

A blue light laser module is generally configured in a structure of a light source module of a laser projector to provide continuous blue light, and the blue light laser may irradiate a rotating phosphor wheel to excite another color light, for example, the blue color laser may irradiate a phosphor adapted to produce a yellow light to produce the yellow light. In a structure of a laser combiner system of a general light source module, an extra light transmission path of the blue light laser is required, such that a volume of the laser combiner system is difficult to be reduced, and a manufacturing cost is increased. Moreover, the laser combiner system based on the above structure is hard to be applied to a projector structure with a three panel structure, for example, a three liquid-crystal display (3LCD) projection system or a three liquid crystal on silicon (3LCoS) projection system.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The embodiment of invention is directed to an illumination system and a projection apparatus, which have a simple structure and a lower manufacturing cost, and are adapted to be combined with an optical lens set system of a multi-panel light valve structure.

Other objects and advantages of the invention can be further illustrated by the technical features broadly embodied and described as follows.

In order to achieve one or a portion of or all of the objects or other objects, an embodiment of the invention provides an illumination system. The illumination system includes a first light-emitting module, a wavelength conversion unit, a spherical-shell-shaped dichroic film and a transparent substrate. The first light-emitting module is configured to emit at least one first color light, where the at least one first color light includes a first partial light and a second partial light. The wavelength conversion unit is disposed on a transmission path of the first partial light, where the first partial light is converged to the wavelength conversion unit, the second partial light passes by a location beside the wavelength conversion unit, and the wavelength conversion unit converts the first partial light into a converted light, where a wavelength of the converted light is greater than a wavelength of the at least one first color light. The spherical-shell-shaped dichroic film is disposed on a transmission path of the at least one first color light between the first light-emitting module and the wavelength conversion unit, and the spherical-shell-shaped dichroic film is pervious to the at least one first color light, and is capable of reflecting the converted light, where the converted light coming from the wavelength conversion unit is reflected by the spherical-shell-shaped dichroic film, and then at least partially coincide with the second partial light. The transparent substrate carries the spherical-shell-shaped dichroic film.

In order to achieve one or a portion of or all of the objects or other objects, an embodiment of the invention provides a projection apparatus including the aforementioned illumination system, a dichroic light splitting/combining module, a plurality of light valves and an imaging lens. The dichroic light splitting/combining module is disposed on transmission paths of the second partial light and the converted light coming from the spherical-shell-shaped dichroic film to split the second partial light and the converted light into a plurality of illumination beams of different colors. The light valves are respectively disposed on transmission paths of the illumination beams of different colors, and respectively convert the illumination beams of different colors into a plurality of image beams of different colors. The imaging lens is disposed on transmission paths of the image beams of different colors, where the dichroic light splitting/combining module combines the image beams of different colors and transmits the image beams of different colors to the imaging lens.

According to the above description, the illumination system and the projection apparatus according to the embodiment of the invention have advantages of a simple structure and a low manufacturing cost, so that structure volumes thereof are reduced and are easy to be combined with an optical lens set system.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
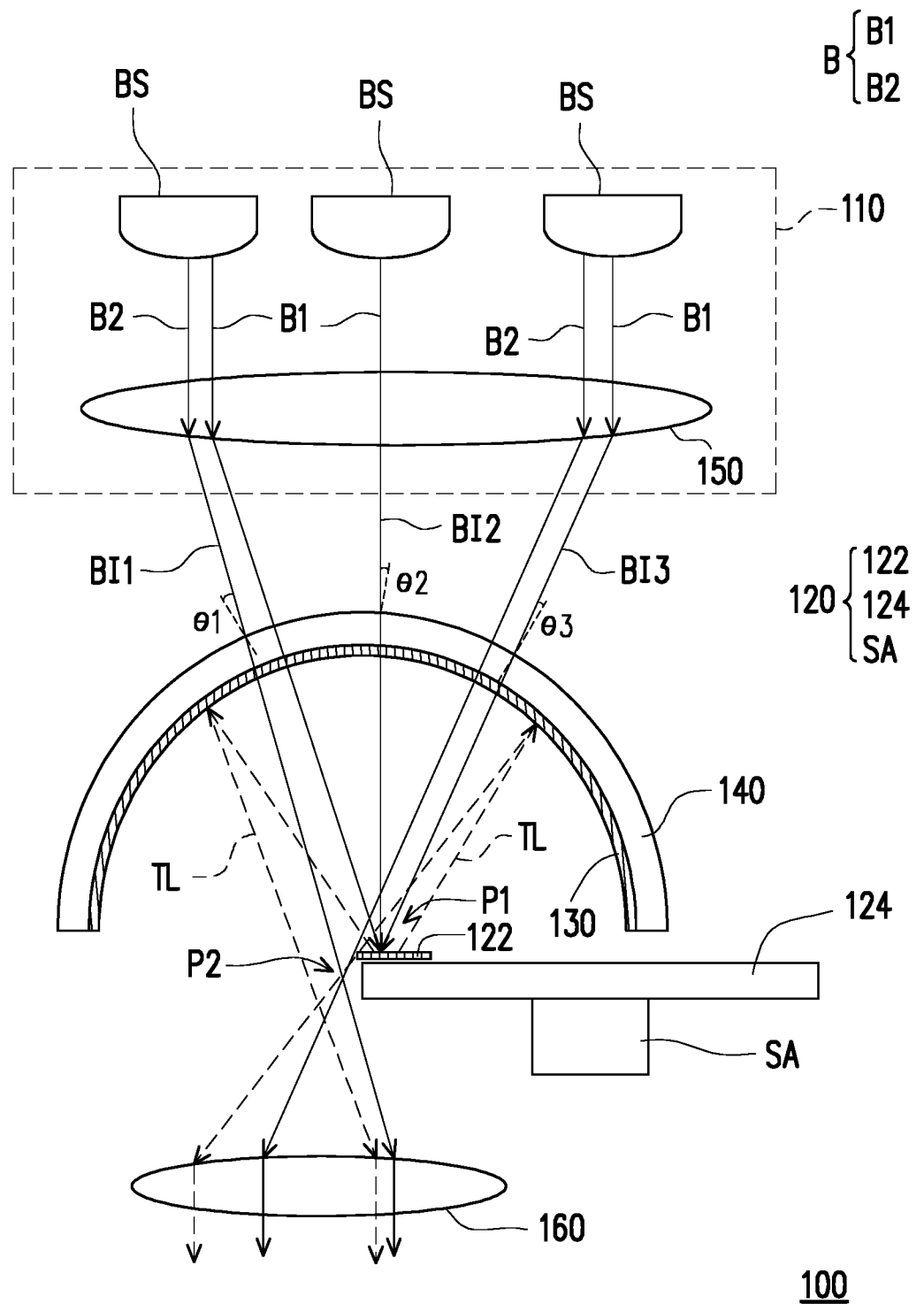
FIG. 1 is a schematic diagram of an illumination system according to an embodiment of the invention.

FIG. 1 is a schematic diagram of an illumination system according to an embodiment of the invention. Referring to FIG. 1, the illumination system 100 includes a first light-emitting module 110, a wavelength conversion unit 122, a spherical-shell-shaped dichroic film 130 and a transparent substrate 140. The first light-emitting module 110 is configured to emit at least one first color light B, and the first color light B may penetrate through the spherical-shell-shaped dichroic film 130 and the transparent substrate 140, where the transparent substrate 140 carries the spherical-shell-shaped dichroic film 130. The first color light B includes a first partial light B1 and a second partial light B2. The wavelength conversion unit 122 is disposed on a transmission path of the first partial light B1 and is carried by a main body part 124 of a rotation wheel 120. In FIG. 1, the first light-emitting module 110 and the rotation wheel 120 are disposed at two opposite sides (for example, an upper side and a lower side of the transparent substrate 140) of the transparent substrate 140. In other words, the spherical-shell-shaped dichroic film 130 and the transparent substrate 140 are disposed on the transmission path of the first color light B between the first light-emitting module 110 and the wavelength conversion unit 122.

The first partial light B1 is converged on the wavelength conversion unit 122 after passing through the spherical-shell-shaped dichroic film 130 and the transparent substrate 140, and the second partial light B2 passes by a location beside the wavelength conversion unit 122 after passing through the spherical-shell-shaped dichroic film 130 and the transparent substrate 140, i.e. the second partial light B2 does not passes through the wavelength conversion unit 122. The wavelength conversion unit 122 converts the first partial light B1 into a converted light TL, where a wavelength of the converted light TL is greater than a wavelength of the first partial light B1 (the first color light B). The spherical-shell-shaped dichroic film 130 is pervious to the first color light B and is adapted to reflect the converted light TL, so that the converted light TL coming from the wavelength conversion unit 122 is reflected by the spherical-shell-shaped dichroic film 130, and then at least partially coincides with the second partial light B2 passing through the spherical-shell-shaped dichroic film 130. The above components are described in detail below.

In the embodiment, the first light-emitting module 110 includes at least one laser light source for emitting the at least one first color light B. In the embodiment of FIG. 1, three sets of laser light sources BS are illustrated, though the number of the laser light sources is not limited to three, and each of the laser light sources BS may include one laser diode, or a plurality of laser diodes arranged in an array. In the embodiment, the first color light B emitted by the laser light source BS is a blue color laser light.

In the embodiment, the first light-emitting module 110 further includes a focusing lens 150, and the first color light B is focused by the focusing lens 150 for entering the transparent substrate 140 and the spherical-shell-shaped dichroic film 130, where an incident angle of a center ray in the first color light B emitted along an optical axis of the laser light source BS being incident on the spherical-shell-shaped dichroic film 130 is smaller than or equal to 30 degrees, and the center ray may belong to the first partial light B1 or the second partial light B2. To be specific, the center ray emitted by the first set of laser light source BS along its optical axis is BI1, which belongs to the second partial light B2; the center ray emitted by the second set of laser light source BS is BI2 and the center ray emitted by the third set of laser light source BS is BI3, which both belong to the first partial light B1. The incident angles of the center rays BI1, BI2 and BI3 incident on the spherical-shell-shaped dichroic film 130 or the transparent substrate 140 are respectively θ1, θ2 and θ3, and are all greater than or equal to 0 degree and are all smaller than or equal to 30 degrees. Taking FIG. 1 as an example, an incident point of the center ray incident on the transparent substrate 140 has a tangent line, and an included angle between a normal line of the tangent line and the center ray is the incident angle. In other embodiments, the center ray may be first incident on the spherical-shell-shaped dichroic film 130, and the incident angle may be an included angle between the center ray and a normal line of a tangent line on the spherical-shell-shaped dichroic film 130.

Figure 2A:
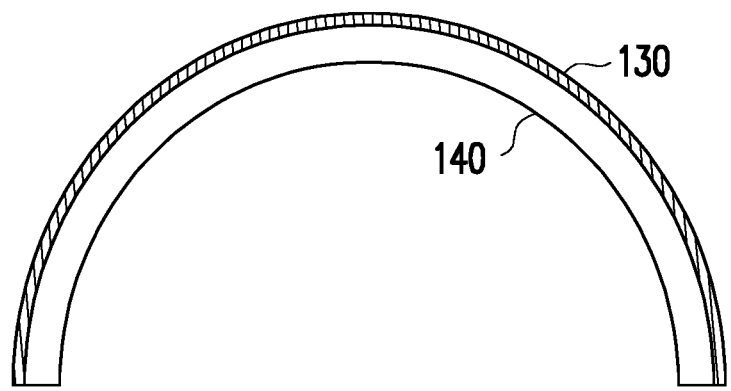
FIG. 2A to FIG. 2C are schematic diagrams of structures of a transparent substrate carrying a spherical-shell-shaped dichroic film according to an embodiment of the invention.
Figure 2B:
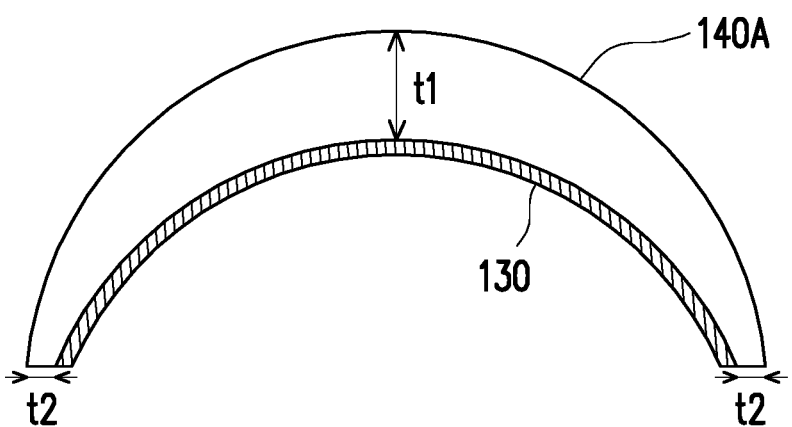
Figure 2C:
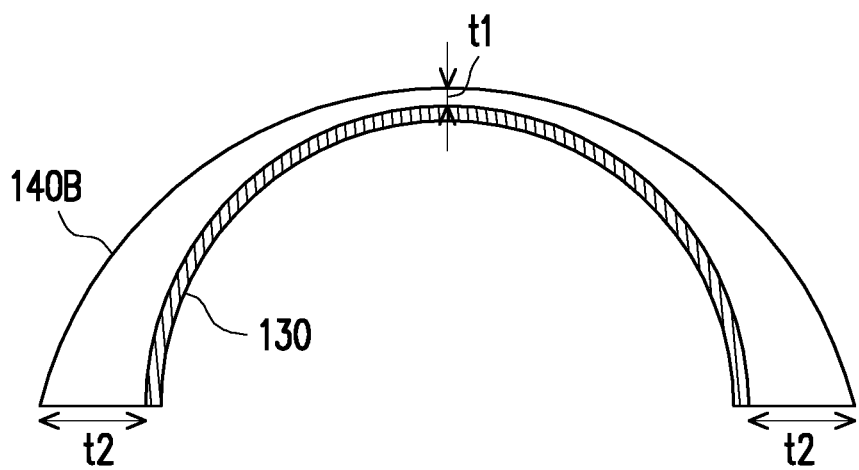

FIG. 2A to FIG. 2C are schematic diagrams of structures of the transparent substrate carrying the spherical-shell-shaped dichroic film according to an embodiment of the invention. Referring to FIG. 1 and FIG. 2A to FIG. 2C, the transparent substrate 140 is intact without a notch or a hole on its surface, and the first color light B may directly penetrate through the transparent substrate 140 without penetrating through the same through a hole or a slit. The spherical-shell-shaped dichroic film 130 presents a shape of a part of a complete sphere without a notch or a hole on its surface, and is adapted to be conformally coated or adhered on any surface of the transparent substrate 140. In the embodiment of FIG. 1, the transparent substrate 140 is a part of a concentric spherical shell with a uniform thickness, and the spherical-shell-shaped dichroic film 130 is conformally coated or adhered on an inner surface (i.e. a surface with a positive curvature) of the transparent substrate 140, i.e. the spherical-shell-shaped dichroic film 130 is disposed on the surface of the transparent substrate 140 facing the wavelength conversion unit 122, though the invention is not limited thereto, and in an embodiment, the spherical-shell-shaped dichroic film 130 may also be coated or adhered on an outer surface of the transparent substrate 140, i.e. the spherical-shell-shaped dichroic film 130 is disposed on the surface of the transparent substrate 140 facing the first light-emitting module 110, as shown in FIG. 2A. In another embodiment, the thickness of the transparent substrate 140 may be uneven, and curvatures of the inner surface and the outer surface thereof may be different, for example, the thickness may be gradually decreased from a spherical shell center towards a spherical shell edge, or the thickness may be gradually increased from the spherical shell center towards the spherical shell edge. For example, a ratio of the thickness of the transparent substrate 140 correspondingly located at the center of the spherical-shell-shaped dichroic film 130 to the thickness of the transparent substrate 140 correspondingly located at the edge of the spherical-shell-shaped dichroic film 130 is within a range from ¼ to 4. In the embodiment of FIG. 2B, the spherical-shell-shaped dichroic film 130 is coated on or adhered to the inner surface of the transparent substrate 140A, and a thickness of the transparent substrate 140A correspondingly located at the center of the spherical-shell-shaped dichroic film 130 is t1, which is greater than a thickness t2 of the transparent substrate 140A correspondingly located at the edge of the spherical-shell-shaped dichroic film 130, i.e. the center of the transparent substrate 140A is the thickest, and the thickness of the transparent substrate 140A is gradually decreased from the center of the transparent substrate 140A towards the edge. In the embodiment of FIG. 2C, the spherical-shell-shaped dichroic film 130 is coated on or adhered to the inner surface of the transparent substrate 140B, and a thickness of the transparent substrate 140B correspondingly located at the center of the spherical-shell-shaped dichroic film 130 is t1, which is smaller than a thickness t2 of the transparent substrate 140B correspondingly located at the edge of the spherical-shell-shaped dichroic film 130, i.e. the center of the transparent substrate 140B is the thinnest, and the thickness of the transparent substrate 140B is gradually increased from the center of the transparent substrate 140B towards the edge of the transparent substrate 140B.

Figure 3:
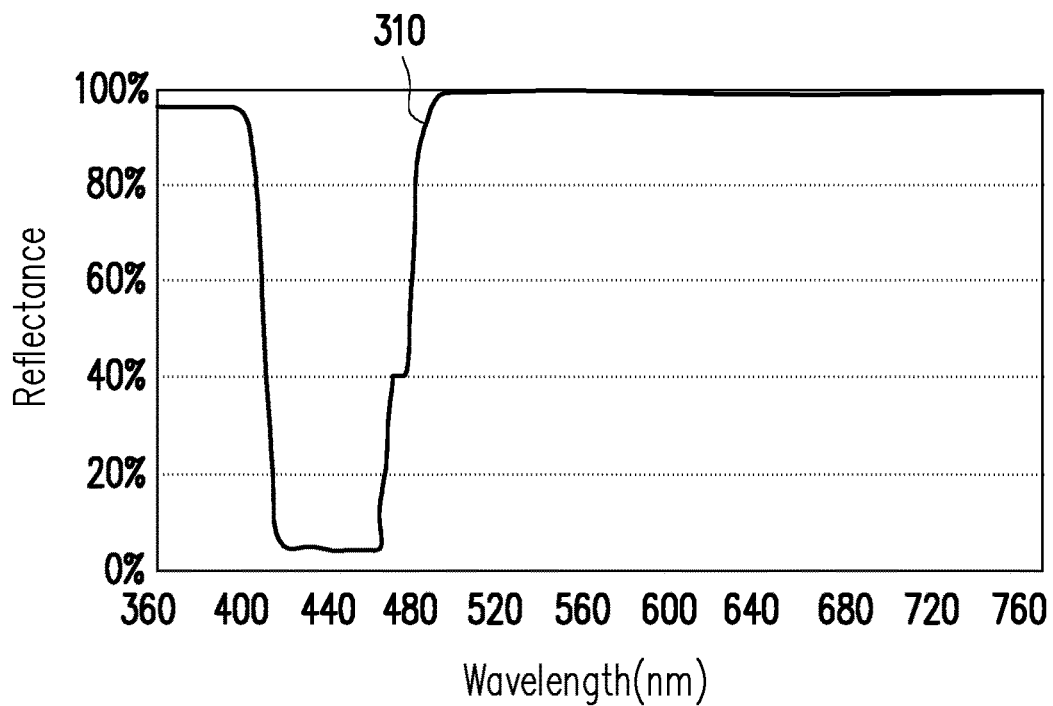
FIG. 3 is a distribution diagram of reflectance of a spherical-shell-shaped dichroic film relative to incident wavelengths according to an embodiment of the invention.
Figure 4:
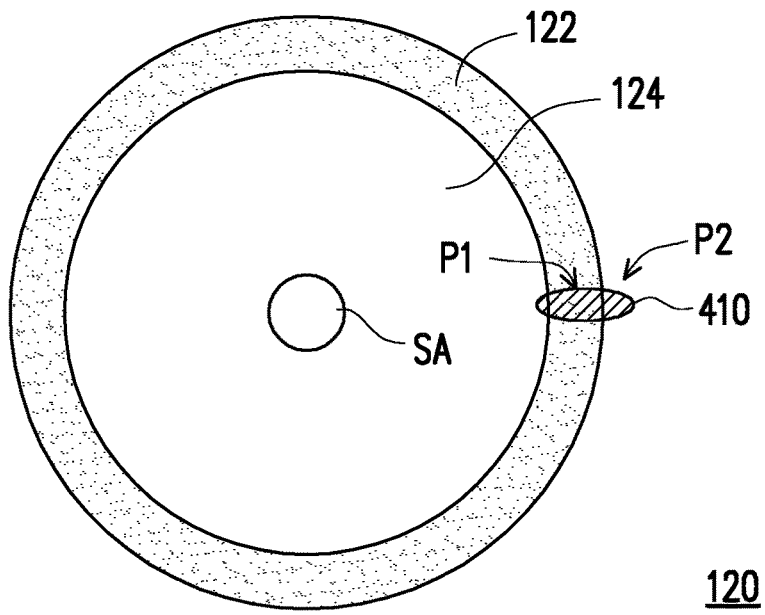
FIG. 4 is a structural schematic diagram of a wavelength conversion unit according to an embodiment of the invention.

FIG. 3 is a distribution diagram of reflectance of the spherical-shell-shaped dichroic film relative to incident wavelengths according to an embodiment of the invention. FIG. 4 is a structural schematic diagram of a wavelength conversion unit according to an embodiment of the invention. Referring to FIG. 1, FIG. 3 and FIG. 4, in the embodiment, the rotation wheel 120 is a phosphor wheel, though the invention is not limited thereto. In the embodiment, the rotation wheel 120 includes the main body part 124, a rotation shaft SA and the wavelength conversion unit 122 disposed on a surface of the main body part 124. The rotation shaft SA is coupled to a motor (not shown), and penetrates through the main body part 124. The wavelength conversion unit 122 is disposed on the main body part 124 of the rotation wheel 120 in a continuous ring shape. In the embodiment, the wavelength conversion unit 122 has at least one kind of photoluminescence material, and the photoluminescence material may receive light with a short wavelength and produce the corresponding converted light TL (as shown in FIG. 1) based on a photoluminescence phenomenon. The photoluminescence material is, for example, phosphor, and a type of the phosphor is, for example, a yellow phosphor capable of being excited to emit a yellow color light, or a green phosphor capable of being excited to emit a green color light, which is not limited by the invention. When the photoluminescence material is the yellow phosphor, the converted light TL is accordingly the yellow color light, and when the photoluminescence material is the green phosphor, the converted light TL is accordingly the green color light.

In the embodiments of FIG. 1 and FIG. 3, a center wavelength of the first color light B is, for example, 445 nm. A wavelength range of the converted light TL is, for example, 480 nm-700 nm. A variation curve of wavelength and reflectance of the spherical-shell-shaped dichroic film 130 for the incident light is 310, and in the embodiment, the reflectance curve 310 indicates that most of the first color light B belonging to a blue waveband may penetrate through the spherical-shell-shaped dichroic film 130, and the reflectance curve 310 indicates that most of the converted light TL belonging to a yellow waveband is reflected by the spherical-shell-shaped dichroic film 130. To be specific, the focusing lens 150 converges the first partial light B1 on the wavelength conversion unit 122 of the rotation wheel 120, and when the rotation wheel 120 rotates, the first partial light B1 keeps irradiating the wavelength conversion unit 122, and the second partial light B2 does not irradiate the wavelength conversion unit 122, but is converged to a position beside the wavelength conversion unit 122, for example, a second position P2. A light spot 410 shown in FIG. 4 is commonly formed by the first partial light B1 and the second partial light B2 of the first color light B. In the following description, a position of the wavelength conversion unit 122 irradiated by the first partial light B1 is referred to as a first position P1, and the first position P1 is located beside a sphere center of the spherical-shell-shaped dichroic film 130.

On the other hand, the spherical-shell-shaped dichroic film 130 converges the converted light TL coming from the wavelength conversion unit 122 to the second position P2 beside the sphere center, and the converted light TL at least partially coincides with the second partial light B2 at the second position P2. Namely, the focusing lens 150 converges at least a part of the second partial light B2 to the second position P2. In other words, after the first color light B passing through the spherical-shell-shaped dichroic film 130, the first partial light B1 and the second partial light B2 respectively irradiate the first position P1 and the second position P2 near the sphere center of the spherical-shell-shaped dichroic film 130, where the first position P1 and the second position P2 are mutually conjugate positions based on the sphere center, and the distance between the sphere center of the spherical-shell-shaped dichroic film 130 and each of the first position P1 and the second position P2 is, for example, greater than 0 cm and smaller than 1/10 of a radius of the spherical-shell-shaped dichroic film 130. The light spot 400 formed by the first partial light B1 and the second partial light B2 of the first color light B corresponds to the first position P1 and the second position P2.

It should be noted that the conjugate positions refer to symmetrical positions that take the sphere center as a center point. Besides, a configuration method of the wavelength conversion unit 122 is not limited by the invention, and in other embodiments, the wavelength conversion unit 122 may be not disposed on the rotation wheel 120, but is disposed on a fixed component.

In the embodiment, the illumination system 100 further includes a collimation lens 160, and the collimation lens 160 is disposed on a transmission path of the second partial light B2 and the converted light TL reflected by the spherical-shell-shaped dichroic film 130, and is configured to collimate the second partial light B2 and the converted light TL. In some embodiments, the illumination system 100 may not include the collimation lens 160.

Figure 5:
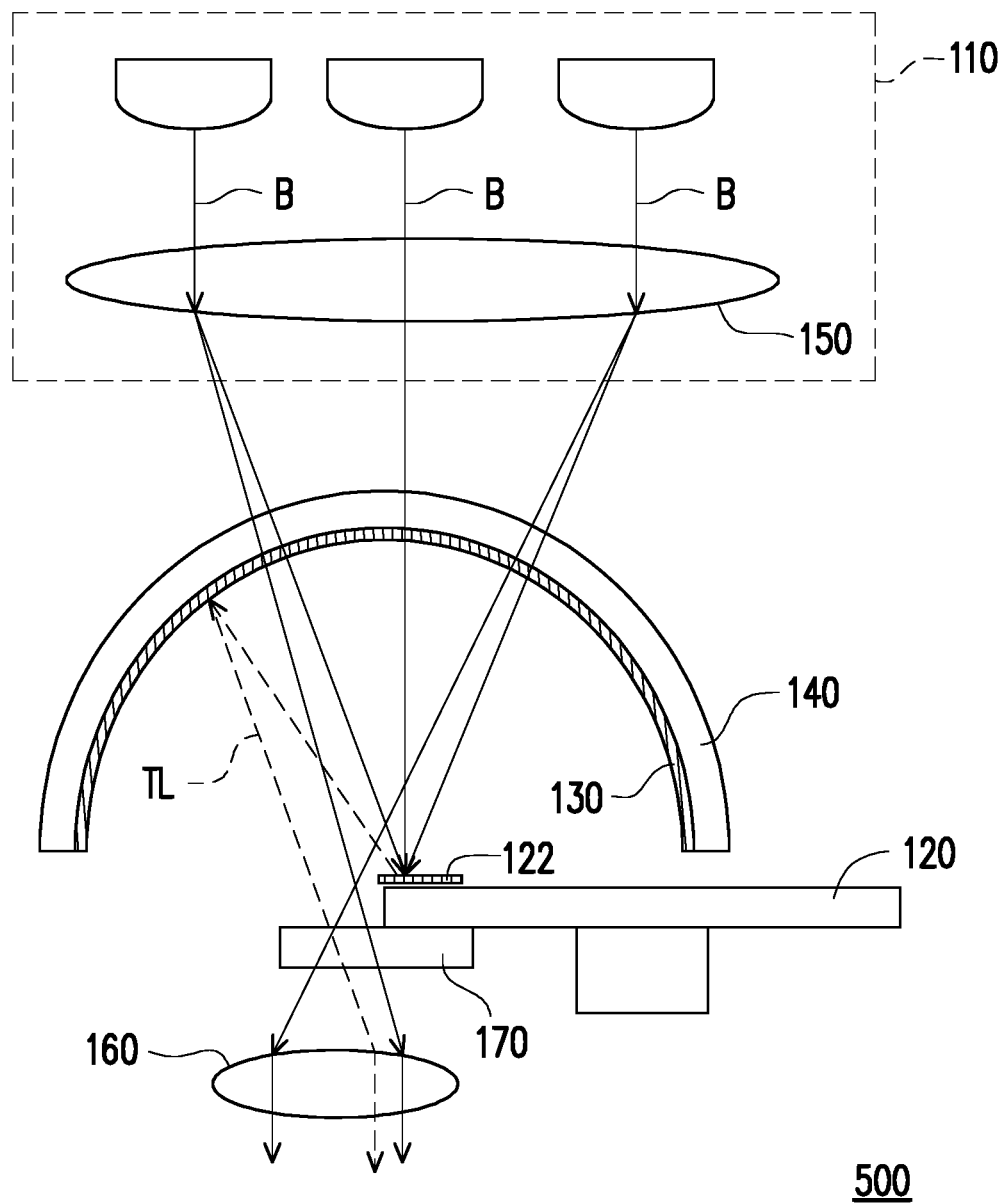
FIG. 5 and FIG. 6 are respectively schematic diagrams of illumination systems according to other embodiments of the invention.
Figure 6:
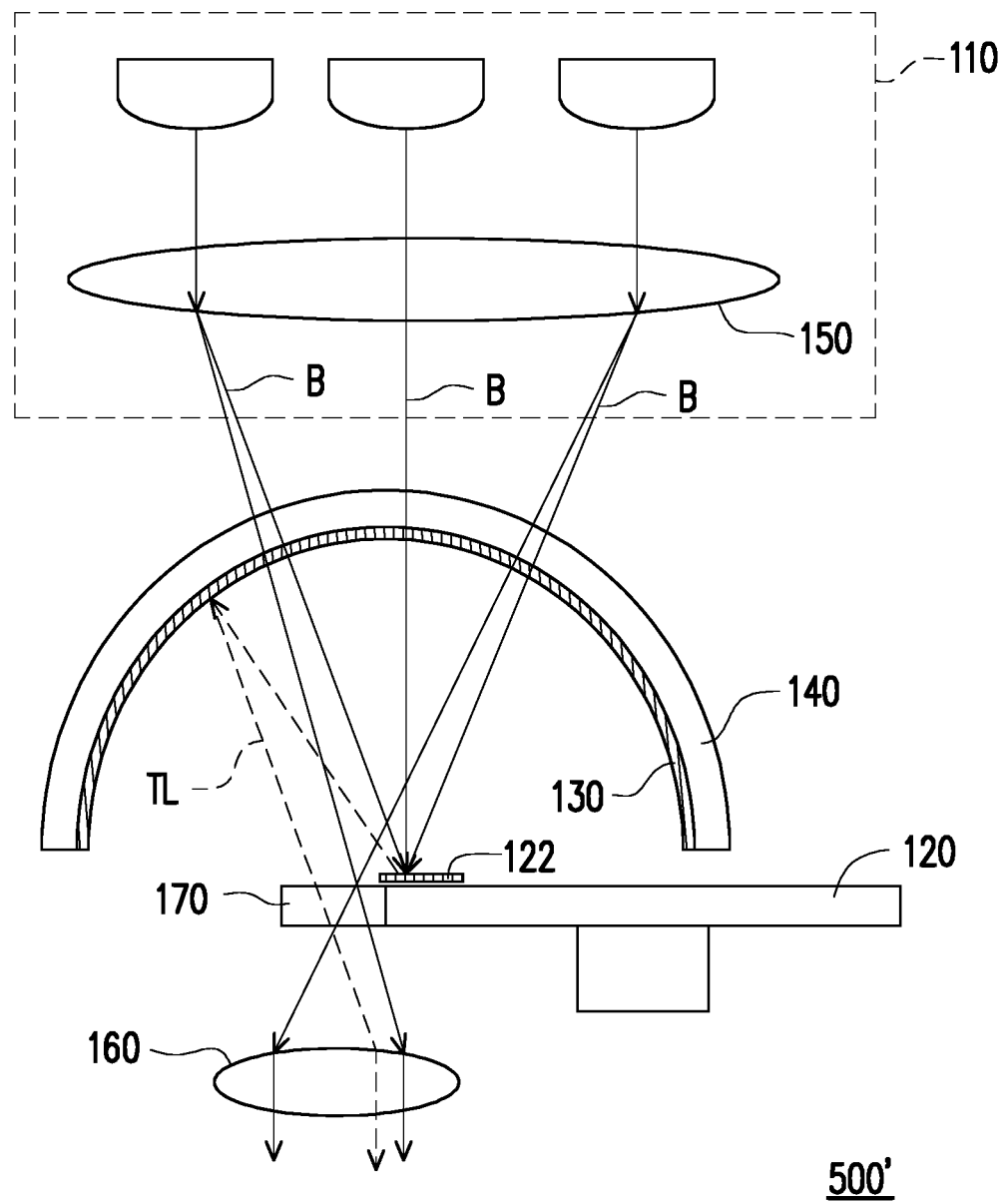

FIG. 5 and FIG. 6 are respectively schematic diagrams of illumination systems according to other embodiments of the invention. Referring to FIG. 5, the embodiment of FIG. 5 is similar to the embodiment of FIG. 1 to FIG. 4, and the illumination system 500 includes the first light-emitting module 110, the rotation wheel 120, the wavelength conversion unit 122, the spherical-shell-shaped dichroic film 130 and the transparent substrate 140. Compared to the illumination system 100, the illumination system 500 further includes a light diffuser 170, the light diffuser 170 is connected to the wavelength conversion unit 122, and is disposed on a transmission path of the second partial light B2 and the converted light TL, and is used for diffusing the converged second partial light B2 and converted light TL so as to uniform the lights.

In the embodiment, the light diffuser 170 is disposed under the rotation wheel 120, and extends out of the rotation wheel 120, such that the converted light TL reflected by the spherical-shell-shaped dichroic film 130 and the second partial light B2 penetrating through the spherical-shell-shaped dichroic film 130 may pass through the light diffuser 170, though the configuration position of the light diffuser 170 is not limited by the invention. Referring to FIG. 6, the illumination system 500' is similar to the illumination system 500, and a difference therebetween is that the light diffuser 170 is disposed at the side of the rotation wheel 120, which is an outer ring relative to the wavelength conversion unit 122. Enough instructions and recommendations for other detailed implementations and configuration relationships of the illumination system 500' and the illumination system 500 may be learned from the description of the aforementioned embodiment, and details thereof are not repeated.

Figure 7:
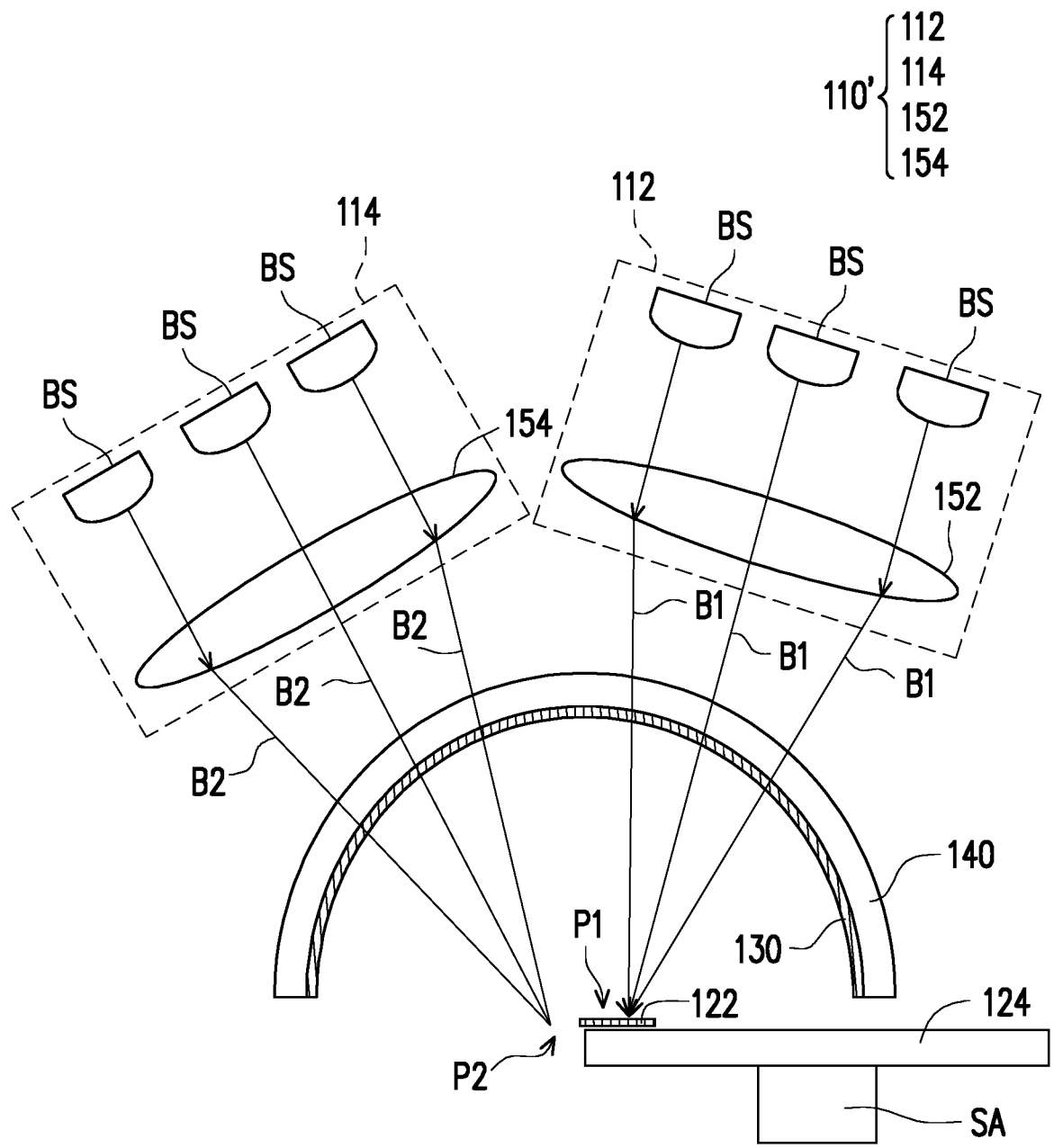
FIG. 7 is a schematic diagram of an illumination system according to another embodiment of the invention.

FIG. 7 is a schematic diagram of an illumination system according to another embodiment of the invention. Referring to FIG. 7, the illumination system 700 includes a first light-emitting module 110', the rotation wheel 120, the wavelength conversion unit 122, the spherical-shell-shaped dichroic film 130 and the transparent substrate 140. The first light-emitting module 110' includes at least one first laser light source 112 and at least one second laser light source 114, and in the embodiment, the at least one first laser light source 112 includes three sets of blue light laser light sources BS used for emitting the first partial light B1, and the at least one second laser light source 114 includes other three sets of blue light laser light sources BS used for emitting the second partial light B2. The number of the laser light sources is not limited by the invention, and each of the laser light sources BS may include one laser diode or a plurality of laser diodes arranged in an array. The first light-emitting module 110' further includes a first focusing lens 152 and a second focusing lens 154, where the first focusing lens 152 converges the first partial light B1 to the wavelength conversion unit 122, i.e. to the first position P1; and the second focusing lens 154 converges the second partial light B2 to a position beside the wavelength conversion unit 122, i.e. to the second position P2. The first partial light B1 is converted into the converted light TL with a longer wavelength by the wavelength conversion unit 122, and the converted light TL is reflected by the spherical-shell-shaped dichroic film 130 for converging to the second position P2 beside the wavelength conversion unit 122, so that the converted light TL and the second partial light B2 at least partially coincide. Enough instructions and recommendations for related implementations, configuration relationships and light transmission paths may be learned from the description of the aforementioned embodiments, and details thereof are not repeated.

Figure 8:
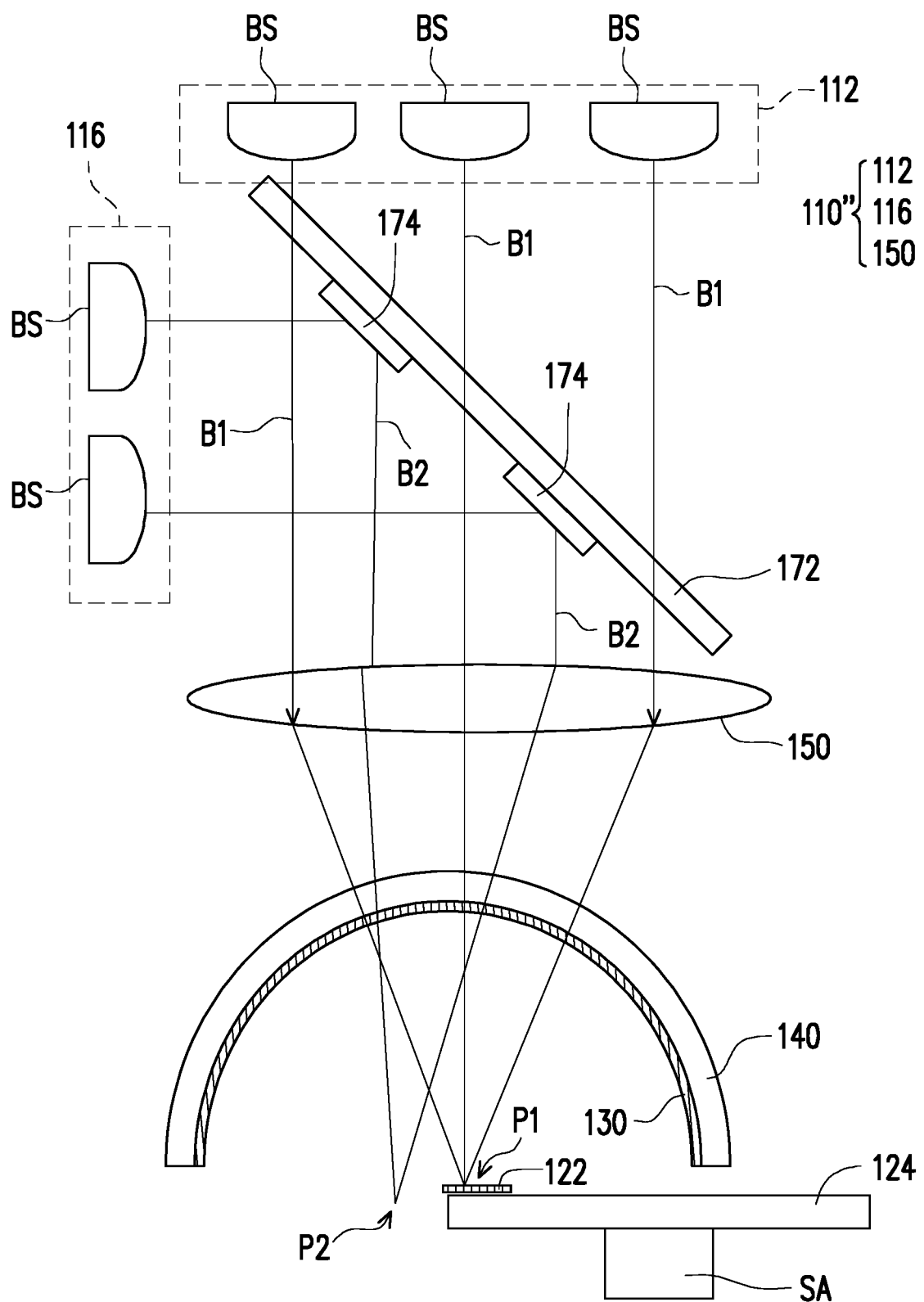
FIG. 8 is a schematic diagram of an illumination system according to another embodiment of the invention.

FIG. 8 is a schematic diagram of an illumination system according to another embodiment of the invention. Referring to FIG. 8, the illumination system 800 includes a first light-emitting module 110", the rotation wheel 120, the wavelength conversion unit 122, the spherical-shell-shaped dichroic film 130 and the transparent substrate 140. The first light-emitting module 110" includes at least one first laser light source 112, at least one second laser light source 116 and a focusing lens 150. In the embodiment, the at least one first laser light source 112 includes three sets of blue light laser light sources BS used for emitting the first partial light B1, and the at least one second laser light source 116 includes other two sets of blue light laser light sources BS used for emitting the second partial light B2. The number of the laser light sources is not limited by the invention, and each of the laser light sources BS may include one laser diode or a plurality of laser diodes arranged in an array. The illumination system 800 further includes a transparent plate 172 disposed in inclination (for example, respectively including an angle of 45 degrees with optical axes of the first laser light source 112 and the second laser light source 116), a reflector array 174, where the transparent plate 172 is disposed on a transmission path of the first partial light B1, and the transparent plate 172 is, for example, a transparent substrate or a hollowed metal plate having openings or slits for allowing the first partial light B1 emitted from the first laser light source to pass through. After the first partial light B1 passes through the transparent plate 172, the first partial light B1 passes through the focusing lens 150 to irradiate the wavelength conversion unit 122 to produce the converted light TL. The reflector array 174 is disposed on a surface of the transparent plate 172 facing the second laser light source 116, and is located on a transmission path of the second partial light B2, and gaps between the adjacent reflectors are located on the transmission path of the first partial light B1.

The reflector array 174 reflects the second partial light B2 to the focusing lens 150, and the second partial light B2 is converged to the position beside the wavelength conversion unit 122 through the focusing lens 150, for example, the second position P2. The converted light TL coming from the wavelength conversion unit 122 is reflected by the spherical-shell-shaped dichroic film 130, and then partially coincides with the second partial light B2. Enough instructions and recommendations for related implementations, configuration relationships and light transmission paths may be learned from the description of the aforementioned embodiments, and details thereof are not repeated.

Figure 9A:
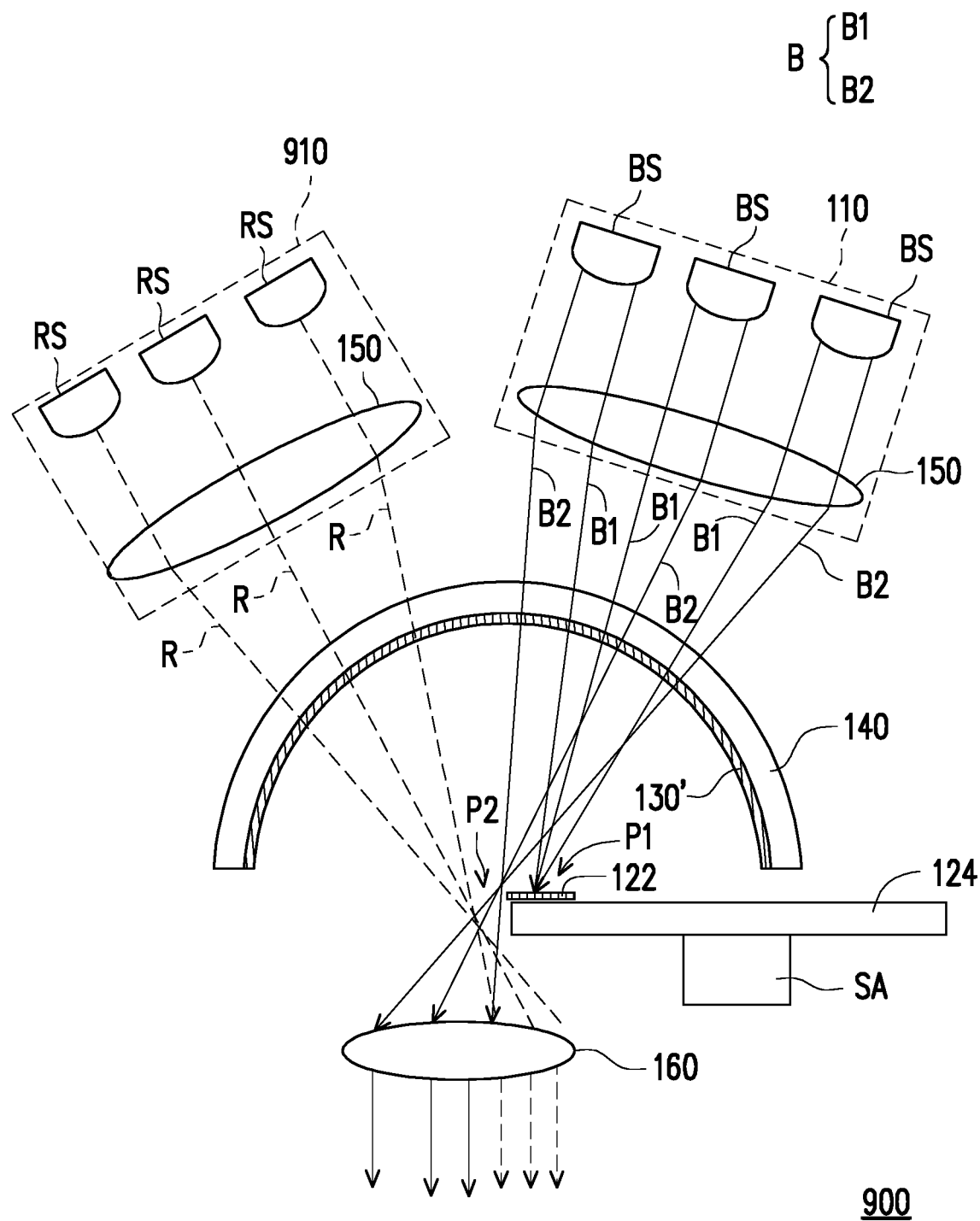
FIG. 9A is a schematic diagram of an illumination system according to another embodiment of the invention.
Figure 9B:
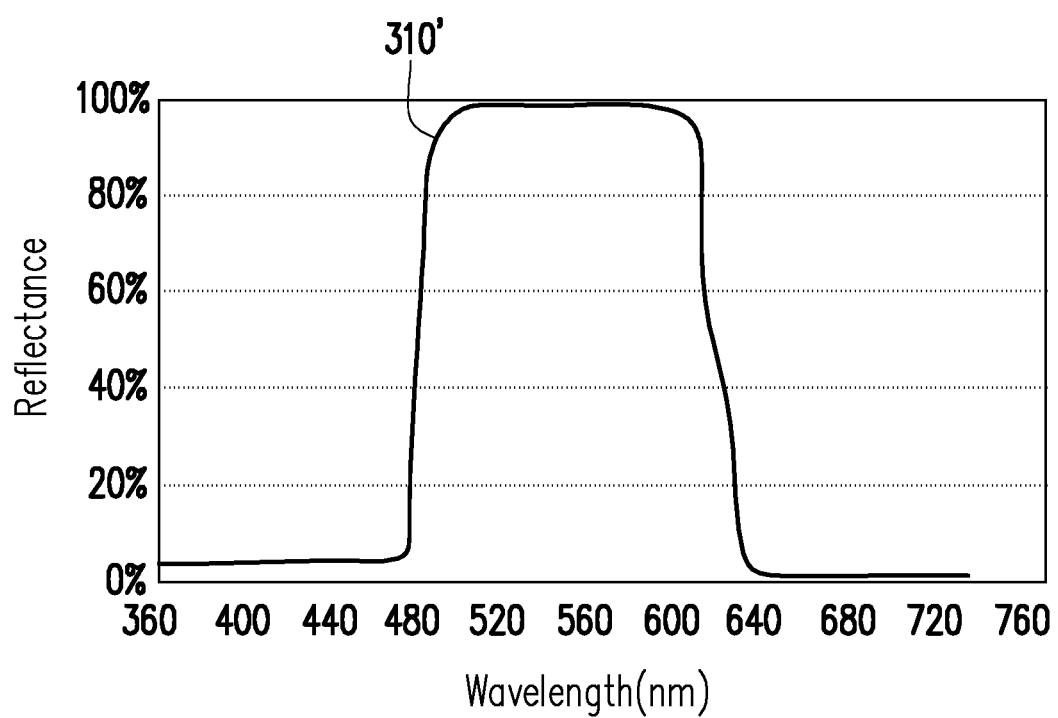
FIG. 9B is a distribution diagram of reflectance of a spherical-shell-shaped dichroic film relative to incident wavelengths according to an embodiment of the invention.

FIG. 9A is a schematic diagram of an illumination system according to another embodiment of the invention. FIG. 9B is a distribution diagram of reflectance of the spherical-shell-shaped dichroic film relative to incident wavelengths according to an embodiment of the invention. Referring to FIG. 9A and FIG. 9B, the illumination system 900 includes the first light-emitting module 110, a second light-emitting module 910, the rotation wheel 120, the wavelength conversion unit 122, a spherical-shell-shaped dichroic film 130' and the transparent substrate 140. The second light-emitting module 910 includes at least one laser light source RS for emitting a second color light R, where the color of the second color light R is different to the color of the first color light B and the color of the converted light TL. In the embodiment of FIG. 9A, three sets of the laser light sources RS are illustrated, though the number of the laser light sources is not limited to three, and each of the laser light sources RS may include one laser diode or a plurality of laser diodes arranged in an array. In the embodiment, the second color light R emitted by the three sets of laser light sources RS is a red laser light, which is different to a blue color of the first color light B and a yellow color of the converted light TL. In the embodiment, the second light-emitting module 910 further includes another focusing lens 150, and the second color light R passes through the corresponding focusing lens 150 and is converged to the position beside the wavelength conversion unit 122, for example, the second position P2.

As shown in FIG. 9A and FIG. 9B, a center wavelength of the first color light B is, for example, 445 nm. A wavelength range of the converted light TL is, for example, 480 nm-700 nm, and a center wavelength of the second color light R is, for example, 635 nm. A variation curve of wavelength and reflectance of the spherical-shell-shaped dichroic film 130' for the incident light is 310', and in the embodiment, the reflectance curve 310' indicates that most of the first color light B belonging to a blue waveband may penetrate through the spherical-shell-shaped dichroic film 130' and be converged to the first position P1 (the first partial light B1) or the second position P2 (the second partial light B2), and the reflectance curve 310' indicates that most of the converted light TL belonging to a yellow waveband is reflected by the spherical-shell-shaped dichroic film 130', and the reflectance curve 310' indicates that most of the second color light R belonging to a red waveband may penetrate through the spherical-shell-shaped dichroic film 130'. Therefore, the spherical-shell-shaped dichroic film 130' converges the converted light TL coming from the wavelength conversion unit 122 to the second position P2 beside the sphere center, where the converted light TL is formed by the wavelength conversion unit 122 converting the first partial light B1.

In the embodiment, the second color light R passing through the spherical-shell-shaped dichroic film 130', the second partial light B2 passing through the spherical-shell-shaped dichroic film 130' and the converted light TL reflected by the spherical-shell-shaped dichroic film 130' at least partially coincide, and enough instructions and recommendations for related implementations, configuration relationships and light transmission paths may be learned from the description of the aforementioned embodiments, and details thereof are not repeated.

Figure 10:
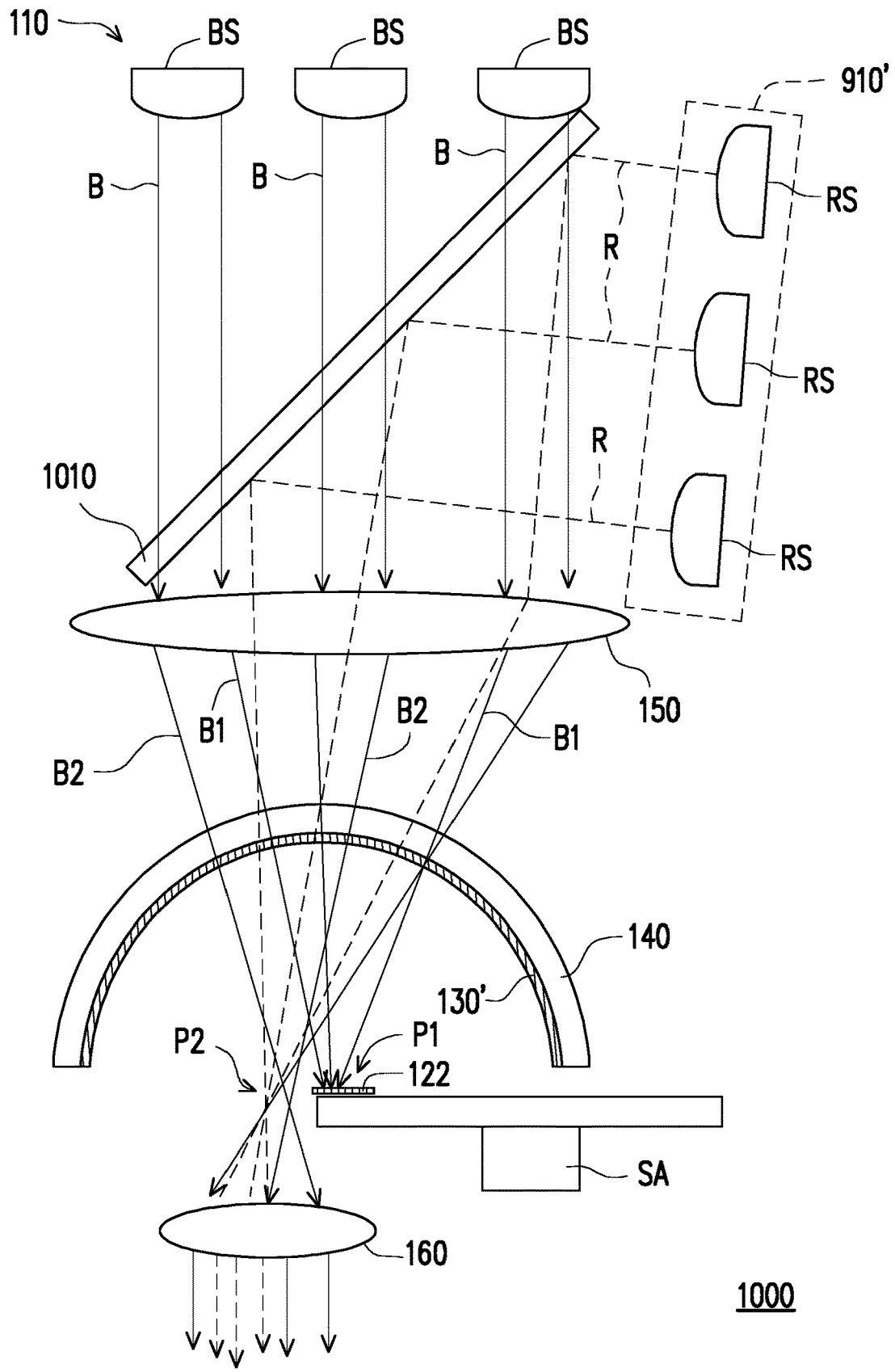
FIG. 10 is a schematic diagram of an illumination system according to another embodiment of the invention.

FIG. 10 is a schematic diagram of an illumination system according to another embodiment of the invention. Referring to FIG. 10, in the illumination system 1000, the second light-emitting module 910' is unnecessary to include the aforementioned another focusing lens 150, and shares the same focusing lens 150 with the first light-emitting module 110.

The illumination system 1000 further includes a light splitting element 1010, and the light splitting element 1010 is an optical element having a light splitting function. In the embodiment, the light splitting element 1010 is a dichroic mirror (DM) having wavelength selectivity, which is a dichroic light splitter that uses wavelengths (colors) to split lights, though the invention is not limited thereto. In the embodiment, the light splitting element 1010 is pervious to the first color light B (blue color), and is adapted to reflect the second color light R (red color). In other words, in the embodiment, the light splitting element 1010 is designed to be pervious to the blue color light and reflect the red color light. After the first color light B passes through the light splitting element 1010, the first partial light B1 in the first color light B is converged to the wavelength conversion unit 122 (for example, the first position P1) by the focusing lens 150, and the second partial light B2 in the first color light B is converged to a position beside the wavelength conversion unit 122 (for example, the second position P2) by the focusing lens 150, and after the second color light R is reflected by the light splitting element 1010, and the second color light R is converged to the position beside the wavelength conversion unit 122 (i.e. the second position P2) by the focusing lens 150. The second color light R, the second partial light B2 and the converted light TL at least partially coincide. Enough instructions and recommendations for related implementations, configuration relationships and light transmission paths may be learned from the description of the aforementioned embodiments, and details thereof are not repeated.

Figure 11:
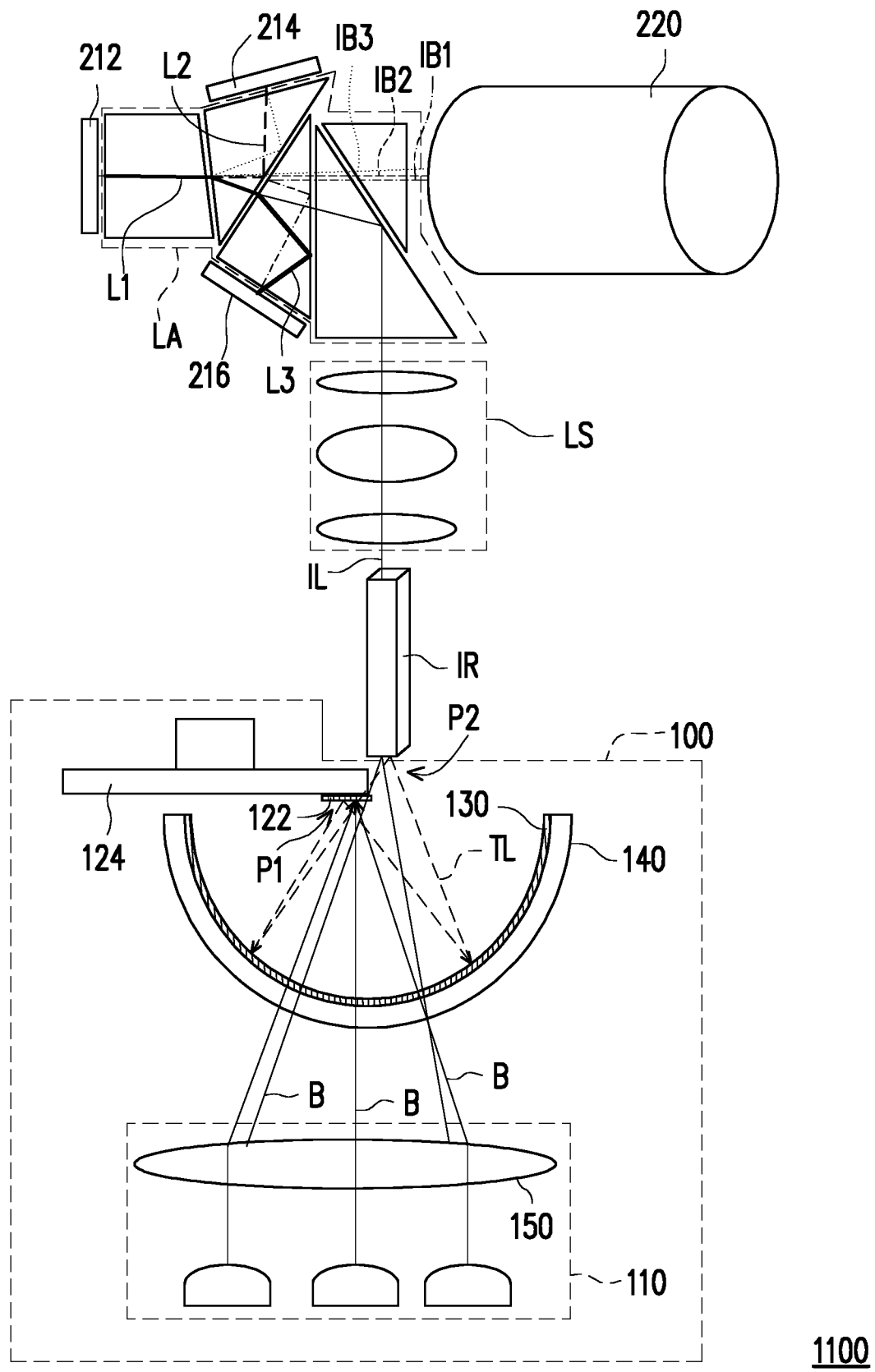
FIG. 11 is a schematic diagram of a projection apparatus according to an embodiment of the invention.

FIG. 11 is a schematic diagram of a projection apparatus according to an embodiment of the invention. Referring to FIG. 11, the projection apparatus 1100 includes the illumination system 100, a dichroic light splitting/combining module LA, a plurality of light valves, for example, a light valve 212, a light valve 214, a light valve 216, and an imaging lens 220. The illumination system of the projection apparatus 1100 may be implemented by any illumination system of the embodiments of FIG. 1 to FIG. 10, and in the embodiment, the illumination system 100 of FIG. 1 is taken as an example for description, and in this case, the illumination system 100 does not include the collimation lens 160. The illumination system 100 provides the second partial light B2 (for example, the blue light) and the converted light TL (for example, the yellow light) reflected from the spherical-shell-shaped dichroic film 130. A light integration rod IR is disposed on the transmission path of the second partial light B2 and the converted light TL, and the second partial light B2 and the converted light TL partially coincide to enter the light integration rod IR to commonly form an integrated light. The light integration rod IR is used for uniforming light, and light passing through the light integration rod IR may be uniformly and accurately projected out.

An optical lens group LS is disposed on a transmission path of the integrated light IL coming from the light integration rod IR. The dichroic light splitting/combining module LA is disposed on the transmission path of the integrated light IL coming from the optical lens group LS, and is located between the light valve 212, the light valve 214, the light valve 216 and the imaging lens 220. The imaging lens 220 is disposed on the transmission path of the light coming from the dichroic light splitting/combining module LA. The integrated light IL is condensed by a light condensing lens group in the optical lens group LS to enter the dichroic light splitting/combining module LA, and the integrated light IL is split by a light splitting prism set in the dichroic light splitting/combining module LA, such that a first split light L1 in the integrated light IL is transmitted to the light valve 212, a second split light L2 in the integrated light IL is transmitted to the light valve 214, and a third split light L3 in the integrated light IL is transmitted to the light valve 216, where the first split light L1, the second split light L2 and the third split light L3 are lights of different colors.

The light valve 212 converts the first split light L1 into a first image beam IB1. The light valve 214 converts the second split light L2 into a second image beam IB2. The light valve 216 converts the third split light L3 into a third image beam IB3. Then, the first image beam IB1, the second image beam IB2 and the third image beam IB3 are transmitted to a projected medium (not shown) by an optical lens set in the dichroic light splitting/combining module LA and the projection lens 220 to form a projection image, those skilled in the art may learn enough instructions and recommendations for detailed steps and implementation method thereof from ordinary knowledge of the technical field, and details thereof are not repeated.

In the embodiment, the light valve refers to any one of spatial light modulators such as a digital micro-mirror device (DMD), a liquid-crystal-on-silicon panel (LCOS panel) or a liquid crystal panel (LCD), etc., and in the embodiment, the number of the light valves is, for example, three, i.e. the light valve 212, the light valve 214, the light valve 216, thought the invention is not limited thereto. In other embodiment, the number of the light valves is, for example, two, and the light splitting prism set in the dichroic light splitting/combining module LA splits the integrated light IL, such that a first split light and a second split light in the integrated light IL are transmitted to one light valve, and a third split light in the integrated light IL is transmitted to another light valve. Those skilled in the art may learn enough instructions and recommendations for implementation of forming the projection image from ordinary knowledge of the technical field, and details thereof are not repeated.

Figure 12:
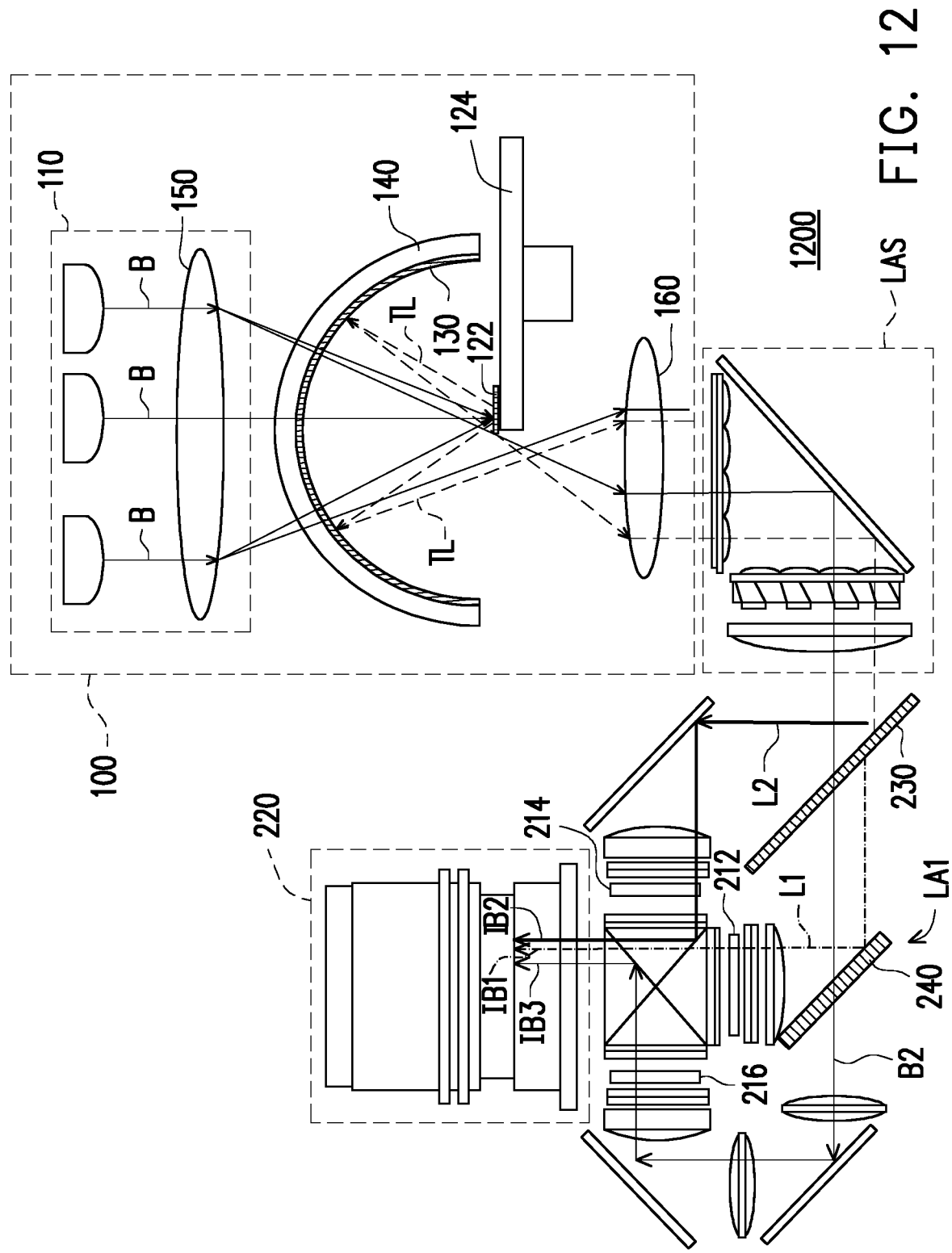
FIG. 12 is a schematic diagram of a projection apparatus according to another embodiment of the invention.

FIG. 12 is a schematic diagram of a projection apparatus according to another embodiment of the invention. Referring to FIG. 12, the projection apparatus 1200 includes the illumination system 100, a dichroic light splitting/combining module LA1, a plurality of light valves, for example, the light valve 212, the light valve 214, the light valve 216, and the imaging lens 220. The illumination system of the projection apparatus 1200 may be implemented by any illumination system of the embodiments of FIG. 1 to FIG. 10, and in the embodiment, the illumination system 100 of FIG. 1 is taken as an example for description, and in this case, the illumination system 100 includes the collimation lens 160. The illumination system 100 provides the second partial light B2 (for example, the blue light) and the converted light TL (for example, the yellow light) collimated by the collimation lens 160. A lens array set LAS is disposed on a transmission path of the second partial light B2 and the converted light TL coming from the illumination system 100, and is located between the illumination system 100 and the dichroic light splitting/combining module LA1. The dichroic light splitting/combining module LA1 is disposed on a light transmission path between the lens array set LAS and the imaging lens 220. The imaging lens 220 is disposed on a transmission path of the light coming from the dichroic light splitting/combining module LA1. The light valve 212, the light valve 214 and the light valve 216 are disposed in the dichroic light splitting/combining module LA1.

The second partial light B2 and the converted light TL leave the lens array set LAS to enter the dichroic light splitting/combining module LA1, where the converted light TL is sequentially split into a first split light L1 and a second split light L2 by a light splitting element 230 and a light splitting element 240, and the second partial light B2 penetrates through the light splitting element 230 and the light splitting element 240 without being split. The first split light L1 is transmitted to the light valve 212, the second split light L2 is transmitted to the light valve 214, and the second partial light B2 is transmitted to the light valve 216, where the first split light L1, the second split light L2 and the second partial light B2 are lights of different colors. The light valve 212 converts the first split light L1 into a first image beam IB1. The light valve 214 converts the second split light L2 into a second image beam IB2. The light valve 216 converts the second partial light B2 into a third image beam IB3. Then, the first image beam IB1, the second image beam IB2 and the third image beam IB3 are transmitted to a projected medium (not shown) by an optical lens set in the dichroic light splitting/combining module LA and the projection lens 220 to form a projection image, those skilled in the art may learn enough instructions and recommendations for detailed steps and implementation method thereof from ordinary knowledge of the technical field, and details thereof are not repeated.

In summary, an exemplary embodiment of the invention provides an illumination system and a projection apparatus, the projection apparatus includes the aforementioned illumination system. The illumination system includes a first light-emitting module adapted to emit a first color light, a wavelength conversion unit, a spherical-shell-shaped dichroic film. The first color light includes a first partial light and a second partial light, where the first partial light is converged to the wavelength conversion unit, and the second partial light is converged to a position beside the wavelength conversion unit and passes by the position beside the wavelength conversion unit. The wavelength conversion unit converts the first partial light into a converted light, where a wavelength of the converted light is greater than a wavelength of the first color light. The spherical-shell-shaped dichroic film is disposed on a transmission path of the first color light, and is located between the first light-emitting module and the wavelength conversion unit, and is pervious to the first color light and is adapted to reflect the converted light. The converted light coming from the wavelength conversion unit is reflected by the spherical-shell-shaped dichroic film, and then at least partially coincides with the second partial light. Therefore, the illumination system and the projection apparatus of the embodiments of the invention have simple structures and lower manufacturing cost, and are adapted to a projection structure with a three-panel type light valve structure.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising:
   a first light-emitting module, configured to emit at least one first color light, wherein the at least one first color light comprises a first partial light and a second partial light;
   a wavelength conversion unit, disposed on a transmission path of the first partial light, wherein the first partial light is converged to the wavelength conversion unit, the second partial light passes by a location beside the wavelength conversion unit, and the wavelength conversion unit converts the first partial light into a converted light, wherein a wavelength of the converted light is greater than a wavelength of the at least one first color light;
   a spherical-shell-shaped dichroic film, disposed on a transmission path of the at least one first color light between the first light-emitting module and the wavelength conversion unit, the spherical-shell-shaped dichroic film being pervious to the at least one first color light, and being capable of reflecting the converted light, wherein the converted light coming from the wavelength conversion unit is reflected by the spherical-shell-shaped dichroic film, and then at least partially coincides with the second partial light; and
   a transparent substrate, carrying the spherical-shell-shaped dichroic film.

2. The illumination system as claimed in claim 1, wherein a position of the wavelength conversion unit irradiated by the first partial light is a first position beside a sphere center of the spherical-shell-shaped dichroic film, and the spherical-shell-shaped dichroic film converges the converted light coming from the wavelength conversion unit to a second position beside the sphere center, and the first position and the second position are mutually conjugate positions based on the sphere center.

3. The illumination system as claimed in claim 2, wherein the first partial light and the second partial light respectively irradiate the first position and the second position.

4. The illumination system as claimed in claim 1, wherein the spherical-shell-shaped dichroic film presents a shape of a part of a complete sphere, and a ratio of a thickness of the transparent substrate correspondingly located at a center of the spherical-shell-shaped dichroic film to a thickness of the transparent substrate correspondingly located at an edge of the spherical-shell-shaped dichroic film is within a range from 1/4 to 4.

5. The illumination system as claimed in claim 1, wherein the first light-emitting module comprises:
   at least one laser light source, emitting the at least one first color light; and
   a focusing lens, converging the first partial light to the wavelength conversion unit, and converging the second partial light to a position beside the wavelength conversion unit.

6. The illumination system as claimed in claim 1, wherein the first light-emitting module comprises:
   at least one first laser light source, emitting the first partial light;
   a first focusing lens, converging the first partial light to the wavelength conversion unit;
   at least one second laser light source, emitting the second partial light; and
   a second focusing lens, converging the second partial light to a position beside the wavelength conversion unit.

7. The illumination system as claimed in claim 1, further comprising a rotation wheel, wherein the rotation wheel comprises a main body part, the wavelength conversion unit is disposed on the main body part of the rotation wheel in a continuous ring shape, and when the rotation wheel rotates, the first partial light keeps irradiating the wavelength conversion unit.

8. The illumination system as claimed in claim 1, further comprising a second light-emitting module configured to emit a second color light, wherein the second color light penetrates through the spherical-shell-shaped dichroic film to at least partially coincide with the second partial light penetrating through the spherical-shell-shaped dichroic film and the converted light, and a color of the second color light is different to a color of the first color light and a color of the converted light.

9. The illumination system as claimed in claim 1, wherein the first light-emitting module comprises at least one laser light source configured to emit the at least one first color light, and an incident angle of a center ray in the at least one first color light emitted along an optical axis of the at least one laser light source being incident on the spherical-shell-shaped dichroic film is smaller than or equal to 30 degrees.

10. The illumination system as claimed in claim 1, further comprising a light diffuser connected to the wavelength conversion unit, and disposed on transmission paths of the second partial light and the converted light.

11. A projection apparatus, comprising:
an illumination system, comprising:
- a first light-emitting module, configured to emit at least one first color light, wherein the at least one first color light comprises a first partial light and a second partial light;
- a wavelength conversion unit, disposed on a transmission path of the first partial light, wherein the first partial light is converged to the wavelength conversion unit, the second partial light passes by a location beside the wavelength conversion unit, and the wavelength conversion unit converts the first partial light into a converted light, wherein a wavelength of the converted light is greater than a wavelength of the at least one first color light;
- a spherical-shell-shaped dichroic film, disposed on a transmission path of the at least one first color light between the first light-emitting module and the wavelength conversion unit, the spherical-shell-shaped dichroic film being pervious to the at least one first color light, and being capable of reflecting the converted light, wherein the converted light coming from the wavelength conversion unit is reflected by the spherical-shell-shaped dichroic film, and then at least partially coincides with the second partial light; and
- a transparent substrate, carrying the spherical-shell-shaped dichroic film;
a dichroic light splitting/combining module, disposed on transmission paths of the second partial light and the converted light coming from the spherical-shell-shaped dichroic film to split the second partial light and the converted light into a plurality of illumination beams of different colors;
a plurality of light valves, respectively disposed on transmission paths of the illumination beams of different colors, and respectively converting the illumination beams of different colors into a plurality of image beams of different colors; and
an imaging lens, disposed on transmission paths of the image beams of different colors, wherein the dichroic light splitting/combining module combines the image beams of different colors and transmits the image beams of different colors to the imaging lens.

12. The projection apparatus as claimed in claim 11, wherein a position of the wavelength conversion unit irradiated by the first partial light is a first position beside a sphere center of the spherical-shell-shaped dichroic film, and the spherical-shell-shaped dichroic film converges the converted light coming from the wavelength conversion unit to a second position beside the sphere center, and the first position and the second position are mutually conjugate positions based on the sphere center.

13. The projection apparatus as claimed in claim 12, wherein the first partial light and the second partial light respectively irradiate the first position and the second position.

14. The projection apparatus as claimed in claim 11, wherein the spherical-shell-shaped dichroic film presents a shape of a part of a complete sphere, and a ratio of a thickness of the transparent substrate correspondingly located at a center of the spherical-shell-shaped dichroic film to a thickness of the transparent substrate correspondingly located at an edge of the spherical-shell-shaped dichroic film is within a range from ¼ to 4.

15. The projection apparatus as claimed in claim 11, wherein the first light-emitting module comprises:
- at least one laser light source, emitting the at least one first color light; and
- a focusing lens, converging the first partial light to the wavelength conversion unit, and converging the second partial light to a position beside the wavelength conversion unit.

16. The projection apparatus as claimed in claim 11, wherein the first light-emitting module comprises:
- at least one first laser light source, emitting the first partial light;
- a first focusing lens, converging the first partial light to the wavelength conversion unit;
- at least one second laser light source, emitting the second partial light; and
- a second focusing lens, converging the second partial light to a position beside the wavelength conversion unit.

17. The projection apparatus as claimed in claim 11, wherein the illumination system further comprises a rotation wheel, the rotation wheel comprises a main body part, the wavelength conversion unit is disposed on the main body part of the rotation wheel in a continuous ring shape, and when the rotation wheel rotates, the first partial light keeps irradiating the wavelength conversion unit.

18. The projection apparatus as claimed in claim 11, wherein the illumination system further comprises a second light-emitting module configured to emit a second color light, wherein the second color light penetrates through the spherical-shell-shaped dichroic film to at least partially coincide with the second partial light penetrating through the spherical-shell-shaped dichroic film and the converted light, and a color of the second color light is different to a color of the first color light and a color of the converted light.

19. The projection apparatus as claimed in claim 11, wherein the first light-emitting module comprises at least one laser light source configured to emit the at least one first color light, and an incident angle of a center ray in the at least one first color light emitted along an optical axis of the at least one laser light source being incident on the spherical-shell-shaped dichroic film is smaller than or equal to 30 degrees.

20. The projection apparatus as claimed in claim 11, wherein the illumination system further comprises a light diffuser connected to the wavelength conversion unit, and disposed on transmission paths of the second partial light and the converted light.

* * * * *